United States Patent
Baeza-Yates et al.

(10) Patent No.: US 12,137,166 B2
(45) Date of Patent: Nov. 5, 2024

(54) CRYPTOGRAPHIC SYSTEMS AND METHODS FOR PROVIDING SERVICES TO AUTHENTICATED USERS

(71) Applicant: Khosla Ventures LLC, Menlo Park, CA (US)

(72) Inventors: Ricardo Baeza-Yates, Palo Alto, CA (US); Juan Garay, Houston, TX (US); Sebastián Pablo Acuña Keller, Las Condes (CL); Andrés Felipe Villavicencio Theodoluz, Ñuñoa (CL); Sebastián Andrés Gálvez Ortiz, Ñuñoa (CL)

(73) Assignee: Khosla Ventures LLC, Menlo Park, CA (US)

( * ) Notice: Subject to any disclaimer, the term of this patent is extended or adjusted under 35 U.S.C. 154(b) by 0 days.

(21) Appl. No.: 18/486,037

(22) Filed: Oct. 12, 2023

(65) Prior Publication Data

US 2024/0129126 A1    Apr. 18, 2024

Related U.S. Application Data

(60) Provisional application No. 63/379,172, filed on Oct. 12, 2022.

(51) Int. Cl.
*H04L 29/06* (2006.01)
*G06F 21/00* (2013.01)
*H04L 9/32* (2006.01)

(52) U.S. Cl.
CPC ............ *H04L 9/3221* (2013.01); *H04L 9/321* (2013.01)

(58) Field of Classification Search
None
See application file for complete search history.

(56) References Cited

U.S. PATENT DOCUMENTS

| 4,309,569 A | 1/1982 | Merkle |
| 11,700,125 B2 * | 7/2023 | Ceravolo .............. H04L 9/3218 |
| | | 713/168 |

(Continued)

FOREIGN PATENT DOCUMENTS

| CN | 113507373 A | 10/2021 |
| WO | WO-2020220413 A1 | 11/2020 |
| WO | WO-2024081809 A1 | 4/2024 |

OTHER PUBLICATIONS

Invitation to pay additional fees for International Application No. PCT/US2023/076728, dated Dec. 8, 2023, 2 pages.

(Continued)

*Primary Examiner* — Lisa C Lewis
(74) *Attorney, Agent, or Firm* — COOLEY LLP

(57) ABSTRACT

A method includes receiving, at a broker processor and from a prover processor, a user request, a user token, and a user cryptographic zero-knowledge proof associated with a user characteristic. The method also includes receiving, at the broker processor, from a service processor, and based on the user request, a requirements specification and the user token. The method also includes generating, via the broker processor, a broker cryptographic zero-knowledge proof based on the requirements specification and the user cryptographic zero-knowledge proof. The method also includes transmitting, via the broker processor and to the service processor, the broker cryptographic zero-knowledge proof to cause the service processor to fulfill the user request.

24 Claims, 13 Drawing Sheets

(56) References Cited

U.S. PATENT DOCUMENTS

| | | | | |
|---|---|---|---|---|
| 2010/0174620 | A1* | 7/2010 | Stringfellow | G06Q 30/0601 |
| | | | | 705/26.1 |
| 2017/0366347 | A1* | 12/2017 | Smith | H04L 9/3247 |
| 2020/0014537 | A1* | 1/2020 | Ortiz | G07C 9/28 |
| 2021/0051027 | A1 | 2/2021 | Wang | |
| 2023/0231699 | A1* | 7/2023 | Richarte | H04B 7/18593 |
| | | | | 713/170 |
| 2023/0318837 | A1* | 10/2023 | Oh | H04L 9/3218 |
| | | | | 713/168 |

OTHER PUBLICATIONS

Author Unknown, RemoteStorage—An open protocol for per-user storage on the Web. Hacker News. Jun. 12, 2018. 4 pages. Retrieved on Nov. 22, 2023, from https://news.ycombinator.com/item?id=17297673.

Author Unknown, The Founder of the World Wide Web—Tim Berners-Lee—Disrupts the Internet . . . Again. Sep. 29, 2018. Iowa Computer Gurus. 5 pages. Retrieved on Nov. 22, 2023, from https://www.iowacomputergurus.com/insights/article/inrupt-on-the-solid-web-platform-is-a-new-paradigm-of-privacy-and-data-ownership.

Author Unknown, unhosted web apps freedom from web 2.0's monopoly platforms definition. Dec. 22, 2010. Unhosted.Org. 4 pages. Retrieved on Nov. 22, 2023, from https://web.archive.org/web/20221008153534/https://unhosted.org/.

Author Unknown, zkStrata: a declarative langauge for zero-knowledge proof specification. Jan. 2020. ZKPROOF. 2 pages. Retrieved on Nov. 22, 2023, from https://community.zkproof.org/t/zkstrata-a-declarative-langauge-for-zero-knowledge-proof-specification/370.

Bunz et al., Bulletproofs: Short Proofs for Confidential Transactions and More. 2018 IEEE Symposium on Security and Privacy (SP). Jul. 2018. 1-46.

Levine, LiveRamp makes its IdentityLink available for RTB. Feb. 26, 2019. 5 pages. Retrieved on Nov. 22, 2023, from https://martech.org/liveramp-makes-its-identitylink-available-for-rtb/#:~:text=Identity%20resolution%20provider%20LiveRamp%20is,devices%20and%20channels%2C%20including%20offline.

Porter, Know the Person Behind the Lead and Watch Your Sales Soar. FullContact. Mar. 29, 2018. 7 pages. Retrieved on Nov. 22, 2023, from https://www.fullcontact.com/blog/2018/03/29/know-person-behind-lead-watch-sales-soar/.

Temkin, Charting a course towards a more privacy-first web. Mar. 3, 2021. 3 pages. Retrieved on Nov. 22, 2023, from https://blog.google/products/ads-commerce/a-more-privacy-first-web/.

The State of Personalization. TWILIO segment, 2022. 32 pages.

Wunderkind, The SmarterHQ Offering is Now Wunderkind Audiences. Wunderkind News. Mar. 31, 2022. 8 pages. Retrieved on Nov. 22, 2023, from https://www.wunderkind.co/blog/article/smarterhq-wunderkind-audiences/.

International Search Report and Written Opinion for International Application No. PCT/US2023/076728 dated Mar. 26, 2024, 17 pages.

* cited by examiner

CRYPTOGRAPHIC SYSTEMS AND METHODS FOR PROVIDING SERVICES TO AUTHENTICATED USERS

CROSS-REFERENCE TO RELATED APPLICATION

This application claims priority to and the benefit of U.S. Provisional Patent Application No. 63/379,172, filed Oct. 12, 2022 and titled "Fair Ads," which is incorporated herein by reference in its entirety.

FIELD

One or more embodiments described herein relate to systems and computerized cryptographic methods for facilitating network-based services and preventing unauthorized use of and access to data.

BACKGROUND

Relevant content can be delivered to a user via a network based on data associated with that user. In some instances, the user can desire to protect this data. As such, it can be desirable to have systems configured to facilitate services based on limited user data.

SUMMARY

According to an embodiment, a method includes receiving, at a broker processor and from a prover processor, a user request, a user token, and a user cryptographic zero-knowledge proof associated with a user characteristic. The method also includes receiving, at the broker processor, from a service processor, and based on the user request, a requirements specification and the user token. The method also includes generating, via the broker processor, a broker cryptographic zero-knowledge proof based on the requirements specification and the user cryptographic zero-knowledge proof. The method also includes transmitting, via the broker processor and to the service processor, the broker cryptographic zero-knowledge proof to cause the service processor to fulfill the user request.

According to an embodiment, a method includes sending, via a prover processor and to a verifier processor, a request and an token, and generating, via the prover processor, a first zero-knowledge proof based on characteristic data. The method also includes sending, via the prover processor and to a broker processor, the first zero-knowledge proof, the request, and the token. The method also includes receiving, at the broker processor and from the verifier processor, at least one condition generated by the verifier processor based on the request and the token. The method also includes generating, via the broker processor, a second zero-knowledge proof based on the first zero-knowledge proof and the at least one condition. The method also includes sending, via the broker processor and to the verifier processor, the second zero-knowledge proof. The method also includes receiving, at the prover processor and from the verifier processor, data to fulfill the request based on the second zero-knowledge proof.

According to an embodiment, a non-transitory, processor-readable medium stores instructions that, when executed by a processor, cause the processor to receive, from a prover processor, a first request and a token, and send, to a broker processor, a requirements specification. The instructions also cause the processor to send, to the broker processor and based on the first request and the token, a second request to cause the broker processor to generate a cryptographic proof based on prover data associated with the prover processor. The instructions also cause the processor to receive, from the broker processor, the cryptographic proof indicating that the prover data conforms with the requirements specification without revealing the prover data. The instructions also cause the processor to receive, from a trusted third party (TTP) and based on at least a portion of the cryptographic proof, a signed hash tree node associated with the portion of the cryptographic proof. The instructions also cause the processor to authenticate, using a cryptographic key, the portion of the cryptographic proof based on the signed hash tree node. The instructions also cause the processor to send, to the prover processor and based on the proof being valid, data to fulfill the first request.

DETAILED DESCRIPTION

Figure 1:
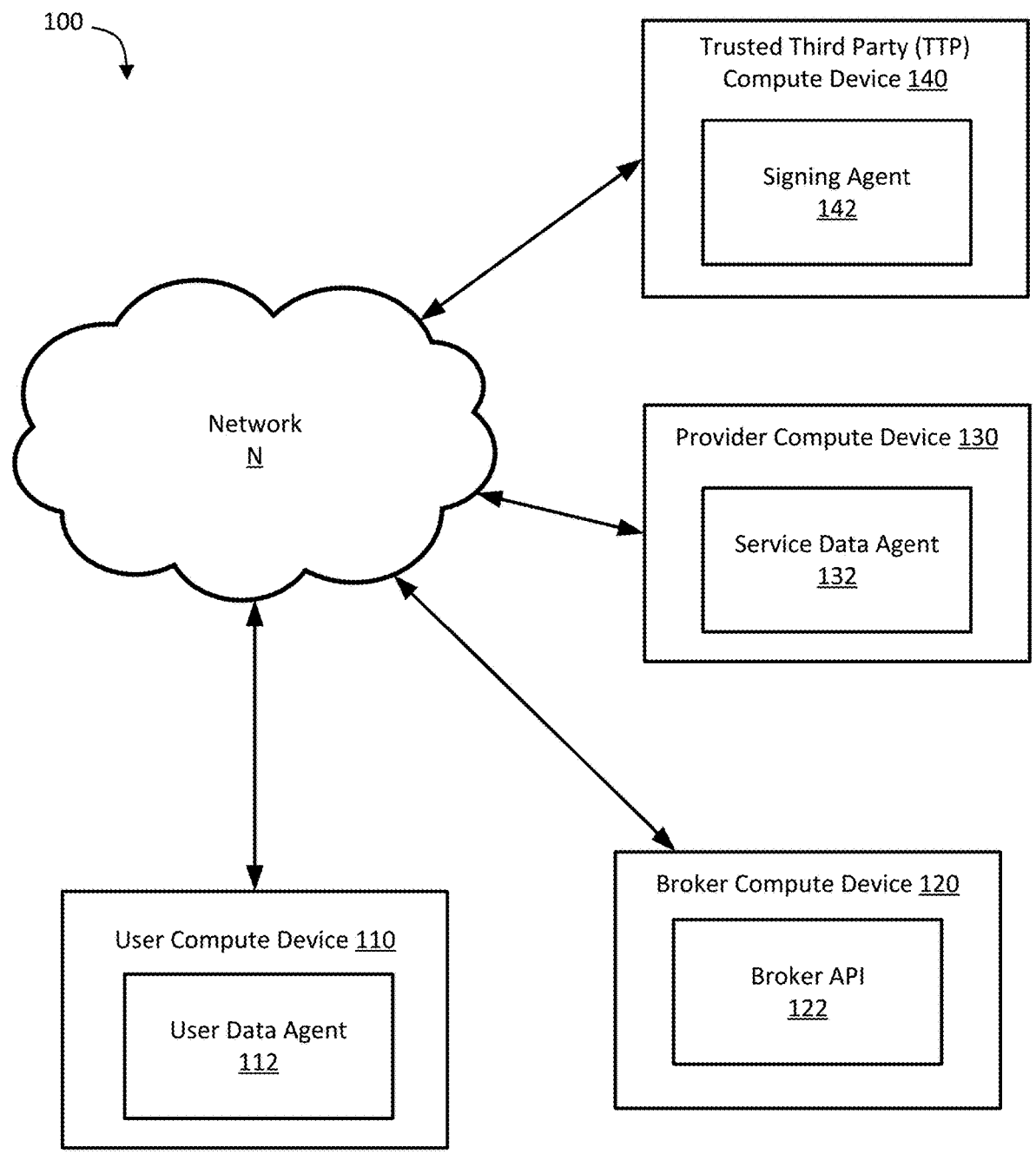
FIG. 1 is a schematic diagram of a cryptography system, according to an embodiment.

FIG. 1 is a schematic diagram of a cryptography system 100 for providing services over networks to users based on limited user data, according to an embodiment. In some implementations, the services can include a network-based service. For example, the services can include data targeted to/curated for a user, and this data can be automatically transmitted to the user in response to a website access request (e.g., a uniform resource locator (URL) request) from the user. Such data can be associated with, for example, an advertisement, health data, a "know your customer" (KYC) application, financial data, privileged data, account data, and/or the like. For example, the cryptography system 100 can be configured to automatically and/or autonomously provide a user with relevant and/or targeted advertisements (also referred to herein as "ads") while limiting/reducing opportunities for service providers (e.g., advertisers) to collect user data and/or track user behaviors and/or user characteristics. The cryptography system 100 can be further configured to connect service providers (e.g., advertisers) with relevant users that the service providers desire to target. Furthermore, in some implementations, the cryptography system 100 can be configured to verify user data, such that the service providers can establish a trust/confidence that a user is associated with defined characteristics that the service providers desire to target.

The cryptography system 100 includes a user compute device 110, a broker compute device 120, a provider compute device 130, a trusted third party (TTP) compute device 140, and a network N. The system 100 can include alternative configurations, and various steps and/or functions of the processes described below can be shared among the various devices of the system 100 or can be assigned to specific devices (e.g., the user compute device 110, the broker compute device 120, the provider compute device 130, the TTP compute device 140, and/or the like).

Each of the compute devices included in the cryptography system 100 (e.g., the user compute device 110, the broker compute device 120, the provider compute device 130, and the TTP compute device 140) can include any suitable hardware-based computing devices and/or multimedia devices, such as, for example, a server, a desktop compute device, a smartphone, a tablet, a wearable device, a laptop and/or the like. In some implementations, the compute devices included in the cryptography system 100 can be implemented at an edge node or other remote computing facility. In some implementations, each of the compute devices included in the cryptography system 100 can be implemented at a data center or other control facility configured to run or execute a distributed computing system and can communicate with other compute devices. As described herein, the user compute device 110 can be associated with a user, the broker compute device 120 can be associated with a broker (e.g., an intermediary), the provider compute device 130 can be associated with a service provider (e.g., an advertiser), and the TTP compute device 140 can be associated with a trusted third party (e.g., a credit bureau, a government entity, and/or any other entity that can receive, store, and/or transmit public (e.g., non-confidential) information, as described herein).

A user associated with the user compute device 110 can include, for example, a user that desires to browse the Internet and/or web-based content (e.g., access website data) while protecting data associated with that user. This data can include, for example, demographic data (e.g., age, gender, nationality, geographic location, employment, income, hobbies, interests, etc.), trend data (e.g., purchase history, browsing history, search history, etc.), and/or the like. The user can be referred to as a "prover," in that the user can prove (e.g., establish) that the user is associated with characteristics to which a service provider desires to target and/or provide a service.

A broker associated with the broker compute device 120 can include, for example, an intermediary service and an application programming interface ("API") that can interact with both the user compute device 110 and the provider compute device 130. For example, the intermediary service, via the API (e.g., the broker API 122, described herein), can receive encrypted user data from the user compute device 110 (e.g., via the network N, described herein), manipulate the encrypted user data, and/or provide the encrypted user data (or a modified/re-encrypted version of the encrypted user data received from the user compute device 110) to the provider compute device 130. The provider compute device 130 can be configured to verify at least a portion of the data received from the broker compute device 120. As a result, the service provider can also be referred to as a "verifier." In some implementations, to verify, the provider compute device 130 can receive, from the TTP compute device 140, verified data associated with an indication of trust. For example, the verified data can include public data and the indication of trust can include a digital signature associated with the TTP compute device 140, as described herein. As a result of the functions performed by the user compute device 110, the broker compute device 120, the provider compute device 130, and/or the TTP compute device 140, the cryptography system 100 can be configured to facilitate a service provided from service provider to users while reducing an amount of user data that is shared with, interpretable by, and/or accessible to the service provider.

Figure 2:
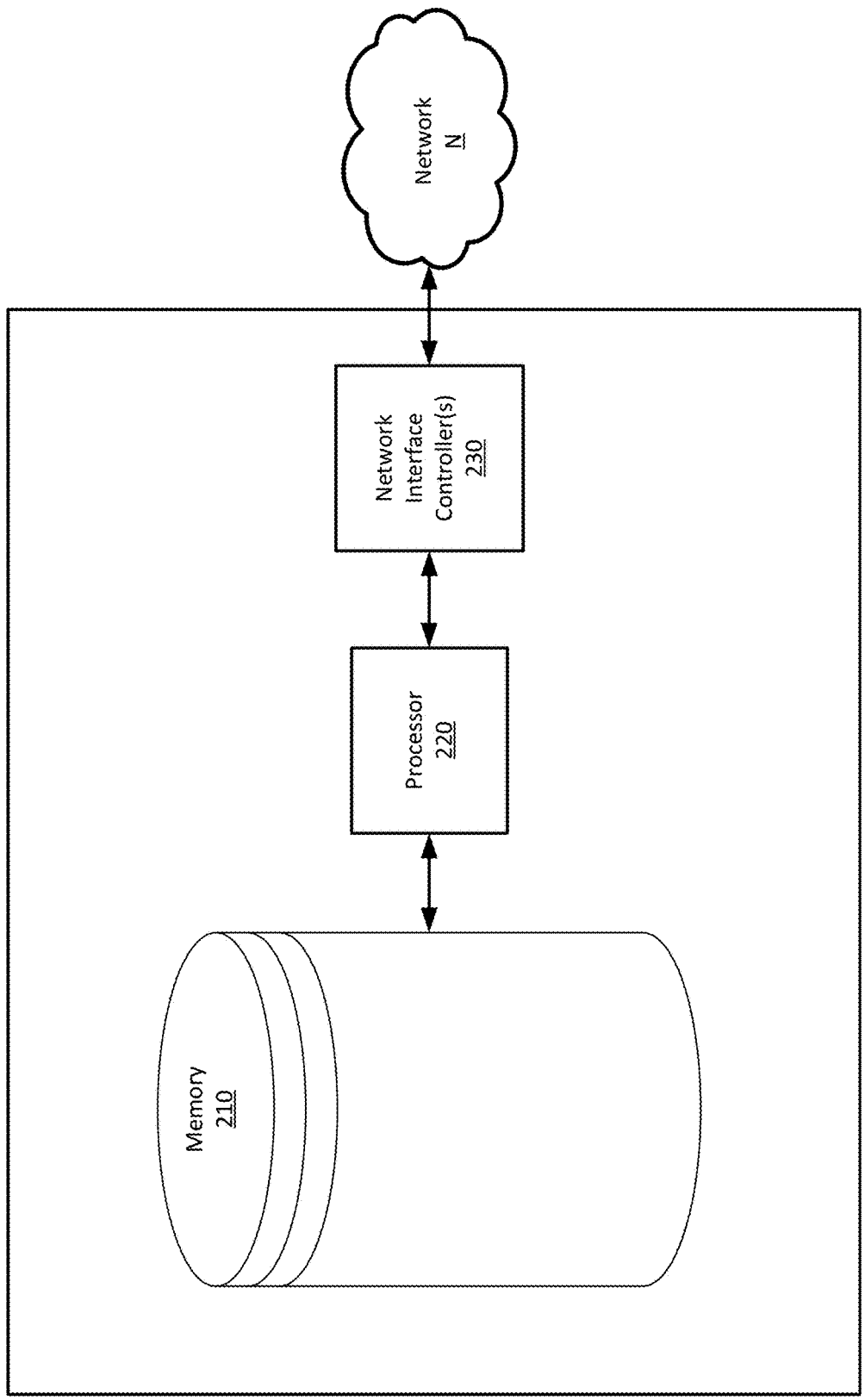
FIG. 2 is a schematic diagram of a compute device included in a cryptography system, according to an embodiment.

The user compute device 110 can include a user data agent 112, which can include, for example, an application that can be stored in a memory of the user compute device 110 and executed via a processor included in the user compute device 110 (e.g., a prover processor and/or a processor functionally and/or structurally equivalent to the processor 220 of FIG. 2, described herein). The user data agent 112 can be configured to generate encrypted user data, which can include, for example, cryptographic proof (e.g., a zero-knowledge cryptographic proof and/or a zero-knowledge proof). A zero-knowledge proof can be configured to indicate (e.g., prove and/or establish) that the user is associated with a value (e.g., an indication of a characteristic) without revealing that underlying value to another entity (e.g., a service provider). Said differently, the zero-knowledge proof can be configured to obfuscate user data (e.g., prover data) but can be used to demonstrate that the user data is true (e.g., that the user is associated with a group that a service provider desires to target and/or serve). For example, the zero-knowledge proof can be configured to obfuscate an age of a user but can be used to demonstrate that the user is within an age range that an advertiser wishes to target with an advertisement campaign. In some implementations, the encrypted user data can be generated based on user data. For example, the user data agent 112 can include an interface (e.g., a graphical user interface (GUI)) that a user can use to enter user data, and the user data agent 112 can store this user data in a memory (e.g., the memory 210 of FIG. 2, described herein) included in the user compute device 110. In some implementations, the user data agent 112 can be configured to store the user data in a data pod (e.g., personal online data storage and/or a decentralized and/or secured data store). In some instances, the user data agent 112 can use a platform (e.g., Solid) for linked data applications that permit users to store their personal data in data pods. Data pods can be under a user's control (although, in some instances, a pod can be hosted at a remote storage/privacy service), and access to data included in a data pod can be specified by standardized access control and authorization mechanisms, such as, for example, OAuth 2.0 and WAC (Web Access Control).

In some implementations, zero-knowledge proofs generated by the user data agent 112 can include, for example, a Bulletproof-based proof, Zkstrata-based proof, etc., and can be constructed using a declarative language that can include a syntax for (1) declaring a question be asked and/or answered and/or (2) facilitating proof composability (e.g., by combining, within the zero-knowledge proof, one or more atomic proofs (e.g., individual questions to be asked and/or answered). A zero-knowledge proof can be generated by the user data agent 112 based on, for example, one or more inputs. These inputs can include, for example, a witness (e.g., a representation of a user profile and/or a collection of user data and/or prover data). The witness can be included in, for example, a JavaScript Object Notation (JSON) document. The inputs can also include a schema definition (e.g., a requirements specification, also referred to herein as a campaign) organized according to a schema (e.g., a JSON schema or any other suitable data format) that can be compiled from the witness. In some instances, a schema definition can be published by a provider (e.g., the service provider associated with the provider compute device 130) requesting the user data. For example, the provider can define one or more fields, datatypes, and/or statements to express at least one condition that the user data can satisfy so that the user can receive the service. The statements can indicate, for example, questions to be asked. An example of a statement is shown in the example code block below. This example statement asserts that the witness should include a field associated with a date of birth that is less than 20020131 (or Jan. 31, 2002).

```
PROOF FOR
    WITNESS myDriverLicense COMPLIANT TO license_state
THAT
    myDriverLicense.dateOfBirth <= 20020131
```

The inputs can also include, for example, metadata, which can include an indication of public data requested by the statement and included in the witness/user profile. Public data can include, for example, data included in a user's credit profile, data stored in a government database (e.g., data associated with a government-issued license), etc. More specifically, public data can include, for example, a birth date, address, first and/or last name, phone number, and/or the like, associated with the user. The public data can be known to the TTP compute device 140, and the TTP compute device 140 can generate the indication of the public data and publish it to a memory accessible to the user compute device 110 and the provider compute device 130. The user compute device 110 can be configured to retrieve the indication of the public data from the memory and include it in the metadata. Alternatively, the user compute device can be configured to generate the Merkle tree root node based on a Merkle tree root validation instruction (described herein) received from the service data agent 132. The indication of the public data can include, for example, a hash tree root node (e.g., a Merkle tree root node). As described herein, the Merkle tree root node can be used by the provider compute device 130 to verify that the public data included in the witness/user profile of the user is truthful and/or accurate. Furthermore, by including the Merkle tree root node in the metadata, the public data itself can remain unrevealed to the provider compute device 130 while still facilitating the verification. The metadata can be in the form of, for example, a JSON document.

In some instances, the statement can further include a Merkle tree root validation instruction. The Merkle tree root validation instruction can define the public data (e.g., date of birth) that is included in the statement and that is to be verified. In some instances, the service data agent 132 can issue the Merkle tree root node when a campaign and/or statement is defined (e.g., as part of a new advertising campaign). The example code block below illustrates an example of a Merkle tree root validation instruction to verify date of birth.

```
PROOF FOR
    WITNESS myDriverLicense COMPLIANT TO license_state
THAT
    myDriverLicense.dateOfBirth <= 20020131
    AND public.rootHash_hex IS MERKLE ROOT OF
    ( ( (private.firstName, private.lastName) ,
(private.dateOfBirth, private.placeOfOrigin) ) ,
    ( (private.dateOfIssue, private.dateOfExpiry) ,
    (private.authority,
        private. Identifier) ) )
```

Based on the witness, schema definition, metadata, and/or statements, the user data agent 112 can be configured to generate at least one proof artifact (e.g., a zero-knowledge proof). As a result of the user compute device 110 receiving the at least one condition (e.g., the schema definition) from the broker compute device 120, the user compute device 110 can be configured to automatically (e.g., without human intervention) generate the at least one proof artifact using the user data agent 112. In some implementations, the metadata and/or the Merkle tree root node can be deciphered from the zero-knowledge proof (e.g., by the provider compute device 130, as described herein).

The schema definition (e.g., the at least one condition) can be generated and/or defined by a service data agent 132, which can include an application stored in a memory of the provider compute device 130 and configured to be executed by processor (e.g., a verifier processor and/or a processor functionally and/or structurally equivalent to the processor 220 of FIG. 2, described herein) included at the provider compute device 130. In some instances, the provider compute device 130 can be configured to cause the at least one condition generated by the service data agent 132 to be sent to the user compute device 110 (via the broker compute device 120) without receiving a request from the user compute device 110. For example, an advertiser can cause the at least one condition to be sent to the user compute device 110 based on the advertiser developing a new advertising campaign for which the advertiser is seeking an audience. Alternatively and/or in addition, in some instances, the provider compute device 130 can be configured to cause the at least one condition to be sent to the user compute device 110 (via the broker compute device 120). For example, a user associated with the user compute device 110 can request access to a website by sending a URL and/or web request via the user compute device 110 and the network N. The service data agent 132 can be configured to receive the request if, for example, the associated service provider is affiliated with the website to which the user is requesting access. For example, the service provider can include an advertiser that displays advertisements within the website. In response to receiving the URL from the user compute device 110, the service data agent 132 can cause the schema definition (e.g., the at least one condition) to be transmitted to the user compute device 110 (via the broker compute device 120). As a result of the user compute device 110 receiving the schema from the service data agent 132 via the broker compute device 120, the user compute device 110 can generate a zero-knowledge proof based on user data relevant to the schema definition. The zero-knowledge proof can include, for example, an indication that data associated with the user either conforms with a condition from the at least one condition included in the schema definition or does not conform with the condition.

In addition to the URL and/or web request, the user data agent 112 can further transmit a token (e.g., an identifier, an identification, membership voucher, a membership indicator, and/or the like) associated with the user. The token can be configured to indicate that the user is associated with a compute device included in the cryptography system 100. For example, the token can indicate to the service data agent 132 that the user is associated with a compute device (e.g., the user compute device 110) that is executing and/or has executed the user data agent 112.

In some instances, a user can be unaffiliated with the user data agent 112 (e.g., the user is associated with a compute device that does not include the user data agent 112). As a result, the user can send a website request that is received by the provider compute device 130, but the user does not send an identifier/membership indicator. As a result of not receiving the membership indicator, the service data agent 132 can be configured to transmit data to the user to fulfill the website request, and this data can be different from data that is transmitted to users who are affiliated with a user data agent 112. For example, the service data agent 132 can be configured to send a general (e.g., untargeted and/or default) advertisement to a user that is not associated with a membership indicator. In this case, in response to determining that a membership indicator was not received at the provider compute device 130, the service data agent 132 can retrieve the general advertisement data from, for example, an advertisement server (e.g., a database of advertisement material and/or data) and transmit that general advertisement data to the user compute device 110 without involving the broker compute device 120.

In some implementations, the token/identifier/membership indicator can be assigned to and/or associated with a user for a specified (e.g., pre-determined and/or limited) time period and/or number of uses. For example, the token/membership indicator can be associated with a user for an hour, a day, a month, a year, a number of transactions (e.g., one transaction and/or use), etc. The token/membership indicator can be configured to expire (e.g., cease being associated with the user) to prevent a service provider from tracking a user and/or collecting information and/or data about a user over a plurality of transactions and/or a period of time. In some implementations, the token/membership indicator can include, for example, a randomly generated number. In some implementations, the user can determine how often a token/membership indicator is rotated and/or regenerated.

If a user is associated with a token/membership indicator (e.g., the user compute device 110 includes a user data agent 112), the user compute device 110 can be further configured to transmit (e.g., via the network N and/or a web browser included in the user compute device 110) a first request (e.g., the web site request and/or the URL), the membership indicator, and/or a zero-knowledge proof. As described above, the user data agent 112 can generate the zero-knowledge response based on the at least one condition defined by the service data agent 132, and the at least one condition can be received by the user data agent 112 prior to and/or following the transmission of the user request (e.g., the website request). Additionally, if the provider compute device 130 receives a membership indicator and the first request from the user compute device 110, the service data agent 132 can be configured to send a second request to the broker compute device 120. The second request can include and/or indicate, for example, at least one condition and the membership indicator.

The broker compute device 120 can include a broker application programming interface (API) 122 configured to accept as input both the first request from the user compute device 110 and the second request from the provider compute device 130. Based on the first request and the second request, the broker compute device 120 can be configured to generate, via a processor (e.g., a broker processor and/or a processor structurally and/or functionally equivalent to a processor 220 of FIG. 2), a broker zero-knowledge proof (e.g., a second zero-knowledge proof and/or proof artifacts) that can indicate that the user is a target that the service provider intends and/or desires to serve. This broker zero-knowledge proof can include the Merkle tree root node such that it is decipherable by the service data agent 132, as described herein. To generate the broker zero-knowledge proof, the broker compute device 120 can be configured to, for example, use HTTPS to decrypt the first request, add a header(s) to the decrypted request, and/or re-encrypt the decrypted request. As a result of this decryption, additional headers, and/or re-encryption, in some implementations, the first zero-knowledge proof (e.g., the user cryptographic zero-knowledge proof) can be different from the second zero-knowledge proof (e.g., the broker cryptographic zero-knowledge proof). To facilitate the generation of the second zero-knowledge proof, the broker compute device 120 can be associated with a trusted certificate authority and/or data provided by the user that grants permission to the broker compute device 120 to sign a certificate. In some implementations, the second zero-knowledge proof (e.g., the broker cryptographic zero-knowledge proof) can be the first zero-knowledge proof (e.g., the user cryptographic zero-knowledge proof). Said differently, in some implementations, the broker compute device 120 can generate the second zero-knowledge proof by receiving the first zero-knowledge proof (and/or associated proof artifacts) and forwarding the first zero-knowledge proof (or a proof equivalent to the first zero-knowledge proof, such as another instance of the first zero-knowledge proof) to the provider compute device 130. The broker compute device can perform this forwarding in response to, for example, the broker compute device receiving the second request from the provider compute device 130.

The service data agent 132 can be configured to authenticate the public data using the TTP compute device 140 and the Merkle tree root node. As described above, this public data can be known to the TTP (e.g., a trusted instance of the public data can be accessible to the TTP compute device 140). A signing agent 142 (stored in a memory of the TTP compute device 140 and executed by a processor of the TTP compute device 140) can use the trusted instance of public data to generate the Merkle tree root node described above using, for example, a Merkle tree. A Merkle tree can include, for example, a tree data structure including a plurality of leaf nodes labelled with a cryptographic hash of a data block. A non-leaf node can be labelled with a cryptographic hash of the labels of children of that non-leaf node. A hash tree can facilitate efficient and/or secure verification of content of large data structures. The Merkle tree used to generate the Merkle tree root node can include leaf nodes associated with the public data included in the Merkle tree root validation instruction described above.

In some implementations, the signing agent 142 can be configured to sign the generated Merkle tree root node (using, for example, a private key) to produce a signed Merkle tree root node. The signing agent 142 can then publish the signed Merkle tree root node to a memory common to (e.g., accessible by) the user compute device 110 and the provider compute device 130, as described above.

The signed Merkle tree root node can be retrieved by the service data agent 132 based on the metadata and/or Merkle tree root node indicated in the broker proof received at the provider compute device 130, as described above. For example, the metadata can be used to search for the user specific signed Merkle tree root node in the memory that signed Merkle tree root nodes are published to by the signing agent 142. In addition to retrieving the signed Merkle tree root node from the public database, the service data agent 132 can also request/retrieve a cryptographic key (e.g., a public key) from, for example, public key infrastructure (PKI) (e.g., a set of roles, policies, hardware, software and/or procedures configured to create, manage, distribute, use, store and/or revoke public-keys) associated with the TTP and/or the private key. The service data agent 132 can use the public key to validate the signature of the received signed Merkle tree root node, which can indicate that the signature (and the associated signed Merkle root node) was generated by the signing agent 142. This can also indicate that the public data that was used to generate the signed Merke tree root node came from a source associated with the TTP, suggesting that the data is trustworthy/accurate.

Having verified the public data associated with the signed Merkle tree root node, the service data agent 132 can be configured to transmit targeted, curated, and/or privileged data to the user compute device 110. The targeted, curated, and/or privileged data can include, for example, targeted advertisement data to be displayed via a web browser (e.g., a web browser that generated the website request) to the user. In some implementations, the service data agent 132 can include an authentication proxy configured to use the membership indicator to communicate with the broker compute device 120 to receive proof artifacts (e.g., the second zero-knowledge proof) and/or verify that a user is a target of a service (e.g., a service associated with a campaign and/or a service that the user is suited for and/or willing to accept). The service data agent 132 can also include an advertisement server that can use the proof artifacts to verify whether the user is an intended target and, based on the verification, serve to the user relevant and/or targeted data (e.g., if the verification is successful) or general and/or untargeted data (e.g., if the verification is unsuccessful).

A device included in the cryptography system 100 can be networked to at least one other device included in the cryptography system 100, via the network N, using wired connections and/or wireless connections. In some examples, the cryptography system 100 described herein can be implemented in a targeted advertisement and/or client engagement platform that is associated with the network N. The network N can include various configurations and protocols, including short range communication protocols such as, for example, Bluetooth™, Bluetooth™ LE, the Internet, World Wide Web, intranets, virtual private networks, wide area networks, local networks, private networks using communication protocols proprietary to one or more companies, Ethernet, Wi-Fi and HTTP, and various combinations of the foregoing. Such communication can be facilitated by any device capable of transmitting data to and from other compute devices, such as a modem(s) and/or a wireless interface(s).

FIG. 2 is a schematic diagram of a compute device 201 of a system, according to an embodiment. The compute device 201 can be structurally and/or functionally similar to, for example, the user compute device 110, the broker compute device 120, the provider compute device 130, and/or the TTP compute device 140, of the cryptography system 100 shown in FIG. 1. Compute device 201 can be a hardware-based computing device, a multimedia device, or a cloud-based device such as, for example, a computer device, a server, a desktop compute device, a laptop, a smartphone, a tablet, a wearable device, a remote computing infrastructure, and/or the like. Compute device 201 includes a memory 210, a processor 220, and one or more network interface controllers 230.

The processor 220 can be, for example, a hardware based integrated circuit (IC), or any other suitable processing device configured to run and/or execute a set of instructions or code (e.g., stored in memory 210). For example, the processor 220 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC), a remote cluster of one or more processors associated with a cloud-based computing infrastructure and/or the like. The processor 220 is operatively coupled to the memory 210 (described herein). In some embodiments, for example, the processor 220 can be coupled to the memory 210 through a system bus (for example, address bus, data bus and/or control bus).

The memory 210 can be, for example, a random-access memory (RAM), a memory buffer, a hard drive, a read-only memory (ROM), an erasable programmable read-only memory (EPROM), and/or the like. The memory 210 can store, for example, one or more software modules and/or code that can include instructions to cause the processor 220 to perform one or more processes, functions, and/or the like. In some implementations, the memory 210 can be a portable memory (e.g., a flash drive, a portable hard disk, and/or the like) that can be operatively coupled to the processor 220. In some instances, the memory can be remotely operatively coupled with the compute device 201, for example, via the one or more network interface controllers 240. For example, a remote database server can be operatively coupled to the compute device 201.

The memory 210 can store various instructions associated with programs, algorithms, and/or data, (e.g., the user data agent 112, the broker API 122, the service data agent 132, and/or the signing agent 142, of FIG. 1). Memory 210 can further include any non-transitory computer-readable storage medium for storing data and/or software that is executable by processor 220, and/or any other medium which may be used to store information that may be accessed by processor 220 to control the operation of the compute device 201.

The one or more network interface controllers 230 can be configured to connect to the network N using any of the wired and wireless short range communication protocols described above, as well as a cellular data network, a satellite network, free space optical network and/or the Internet.

In some instances, the compute device 201 can further include a display, an input device, and/or an output device (not shown in FIG. 2). The display can be any display device by which the compute device 201 can output and/or display data. The input device can include a mouse, keyboard, touch screen, voice interface, and/or any other hand-held controller or device or interface via which a user may interact with the compute device 201. The output device can include a bus, port, and/or other interfaces by which the compute device 201 may connect to and/or output data to other devices and/or peripherals.

Figure 3:
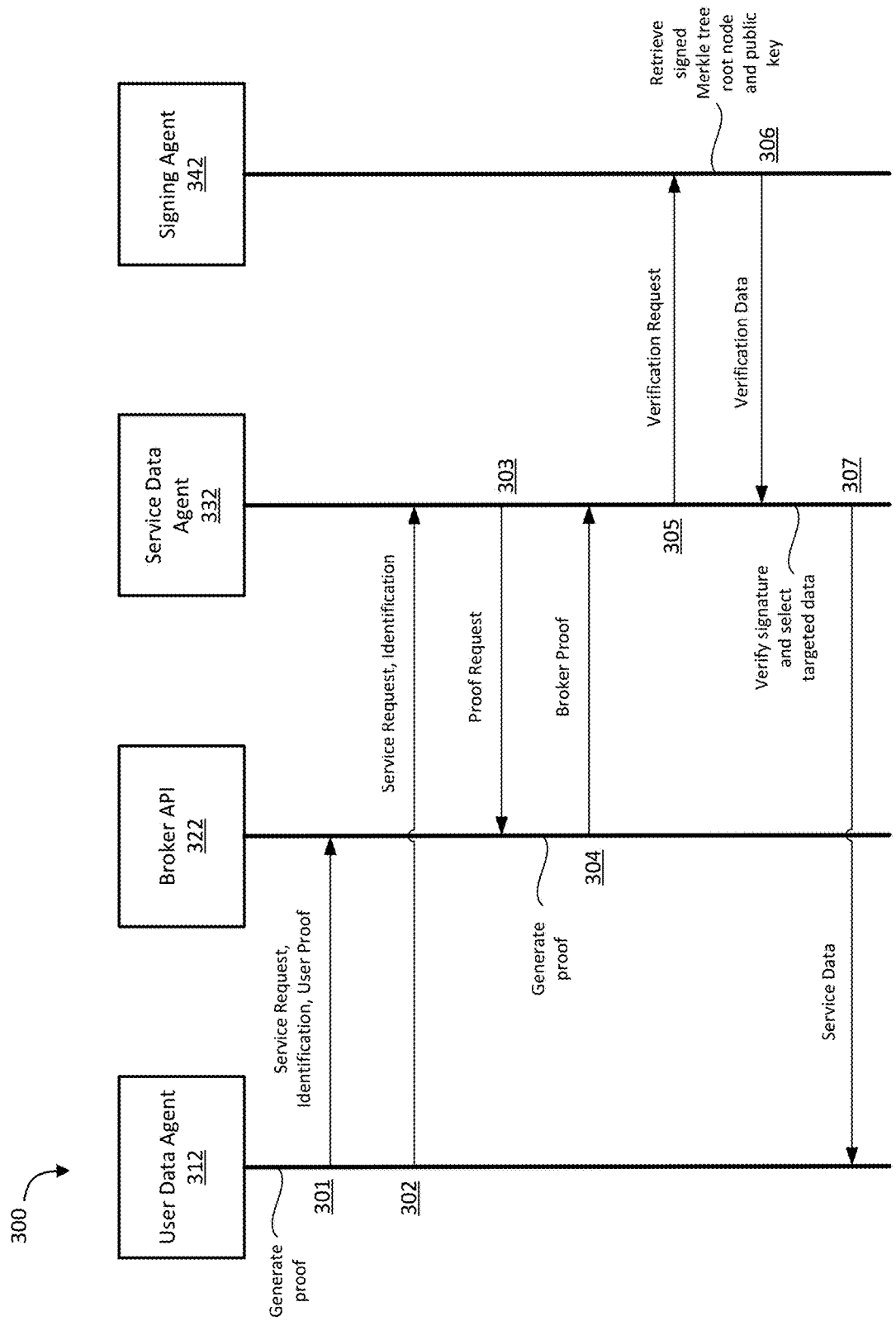
FIG. 3 is a schematic diagram of a framework and a plurality of interactions included in a cryptography system, according to an embodiment.

FIG. 3 is a schematic diagram illustrating a framework 300 and a plurality of interactions 301-307 (e.g., transmissions, signals, etc.) to facilitate targeted services over networks and between providers and users, according to an embodiment. The framework 300 can be associated with at least one compute device (e.g., at least one compute device that is structurally and/or functionally similar to the compute device 201 of FIG. 2 and/or the user compute device 110, the broker compute device 120, the provider compute device 130, and/or the TTP compute device 140, of FIG. 1). In some instances, for example, the framework 300 can be implemented as software stored in memory 210 and configured to be executed via the processor 220 of FIG. 2. In some instances, for example, at least a portion of the framework 300 can be implemented in hardware. The framework 300 includes a user data agent 312 (which can be structurally and/or functionally equivalent to the user data agent 112 of FIG. 1), a broker API 322 (which can be structurally and/or functionally equivalent to the broker API 122 of FIG. 1), a service data agent 332 (which can be structurally and/or functionally equivalent to the service data agent 132 of FIG. 1), and/or a signing agent 342 (which can be structurally and/or functionally equivalent to the signing agent 142 of FIG. 1).

The user data agent 312 can be configured to generate a first proof (e.g., a user zero-knowledge proof, proof artifacts, etc.). The first proof can include, for example, metadata, which can include a Merkle tree root node. After generating the first proof, the user data agent 312 can cause the interactions 301 and 302. The interaction 301 can include a transmission of data from the user data agent 312 to the broker API 322. This data can include, for example, a service request (e.g., a website request and/or a URL), an identification (e.g., a membership indicator and/or identifier), and/or the first proof. The interaction 302 can include a transmission of data from the user data agent 312 to the service data agent 332. This data can include, for example, the service request and the identification and/or membership indicator. In some instances, the interaction 301 can occur before the interaction 302, after the interaction 302, concurrently with the interaction 302, etc. In response to the interaction 302, the service data agent 332 can cause the interaction 303. The interaction 303 can include transmitting data form the service data agent 332 to the broker API 322. This data can include, for example, a proof request. In response to the interaction 303, the broker API 322 can be configured to cause generation of a second proof (e.g., a broker zero-knowledge proof, proof artifacts, etc.). The second proof, like the first proof, can include the metadata, which can include the Merkle tree root node. Following generation of the second proof, the broker API 322 can be configured to cause the interaction 304. The interaction 304 can include transmitting data from the broker API 322 to the service data agent 332. This data can include, for example, the second proof.

In response to the interaction 304, the service data agent 332 can be configured to cause the interaction 305. The interaction 305 can include a transmission of data from the service data agent 332 to the signing agent 342. This data can include, for example, a verification request and/or an indication of public data (e.g., the Merkle tree root node) included in the second proof received from the broker API 322. In response to the interaction 305, the signing agent 342 can be configured to retrieve a signed Merkle tree root node (signed using a private key). The verification request of the interaction 305 can also include a request to a public key store associated with the service data agent 332, causing the signing agent 342 to generate (or, alternatively, locate) a public key associated with the signed Merkle tree root node. As a result of the generation and/or locating of the signed Merkle tree root node, interaction 306 can include transmitting verification data from the signing agent 342 to the service data agent 332. The verification data can include, for example, the signed Merkle tree root node and the public key. The service data agent 332 can then use the public key to confirm the validity of a signature of the signed Merkle tree root node. Having validated the signature, the service data agent 332 can be configured to cause the interaction 307. The interaction 307 can include transmitting curated, selected, and/or privileged data from the service data agent 332 to the user data agent 312. This data can include, for example, advertisement data configured for a user with characteristics associated with the user proof.

Figure 4:
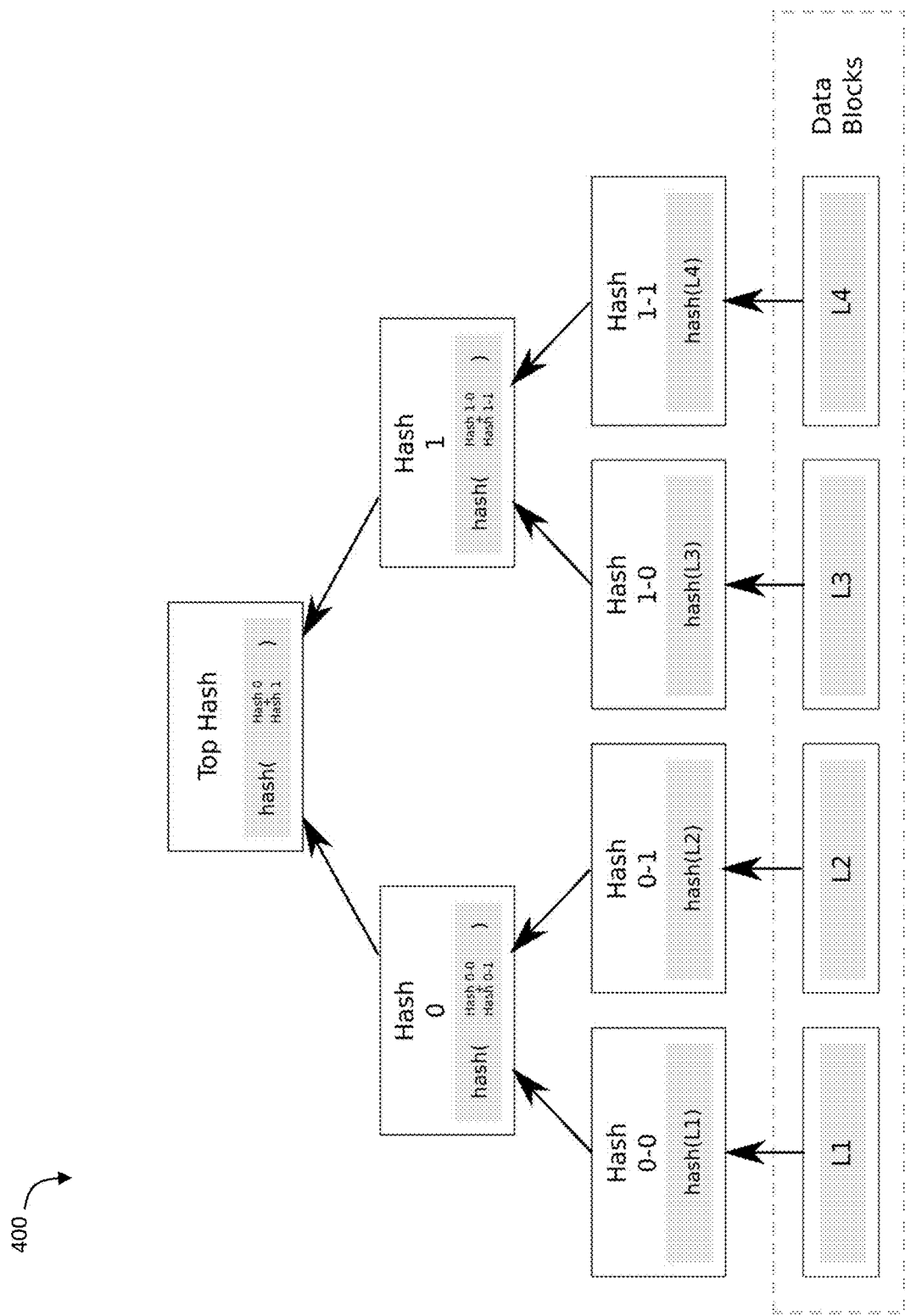
FIG. 4 is a schematic diagram of a Merkle tree included in a cryptography system, according to an embodiment.

FIG. 4 illustrates a Merkle tree 400 with data stored at each leaf node (e.g., data blocks L1, L2, L3, and L4) of the Merkle tree 400. The other nodes within the Merkle tree 400 contain a hash (or hash value) of the concatenated contents of that node's child nodes. For example, node 0-0 contains a hash of data block L1 (the sole child of 0-0); node 0-1 contains a hash of data block L2; node 1-0 contains a hash of data block L3; and node 1-1 contains a hash of data block 1-1. Moreover, node 0 contains a hash of concatenated nodes 0-0 and 0-1; node 1 contains a hash of concatenated nodes 1-0 and 1-1; and the root (e.g., top) node of the Merkle tree 400 contains a hash of concatenated nodes 0 and 1.

Data (e.g., public data) can be verified as being contained in a leaf node of the Merkle tree 400 using the data, a Merkle path of the data, and the root node. A Merkle path of the data includes each sibling node of the nodes in a sequence from the data to the root node of the Merkle tree. For example, a Merkle path of the data block L1 includes nodes 0-1 and 1 (the sibling nodes of the nodes 0-0 and 0, respectively, with nodes 0-0 and 0 being the sequence of nodes from the data block L1 to the root/top node). Specifically, based on the nodes in the Merkle path of the data block L1 (i.e., nodes 0-1 and 1) and the root node, a user can verify that the data block L1 is in the Merkle tree 400. For example, the hash at 0-0 can be calculated based on a hash of the data block L1; the hash at node 0 can be calculated based on a hash of node 0-0 (previously calculated) and node 0-1 (provided as part of the Merkle path); and the hash at the root node can be calculated based on a hash of node 0 (previously calculated) and node 1 (provided as part of the Merkle path). In some embodiments, the root node can be compared with some other value (e.g., an encrypted message) to verify the authenticity/integrity/accuracy of that other value.

In some embodiments, the root node of the Merkle tree 400 can be signed using a private key, resulting in a signed root node. Once the root is calculated and signed, the signature of the signed root node can be validated by a compute device (e.g., a verifier, such as the provider compute device 130 of FIG. 1) using a public key associated with the private key(s). As a result of validating the signature using the public key, the verifier can confirm that the signature is valid, indicating that the underlying data is authentic/trustworthy.

Turning to the methods and systems described herein, a signing agent (e.g., the signing agent 142 and/or 342) can be configured to generate the signed root node based on a trusted instance of public user data, and the signing agent can publish the signed root node to a first memory accessible to a service data agent (e.g., the service data agent 132 and/or 332). The service data agent can retrieve, from a second memory (e.g., a public key store), a public key generated and/or published by the signing agent. The signing agent can use the public key to validate the signature and, as a result, verify the public data.

Figure 5:
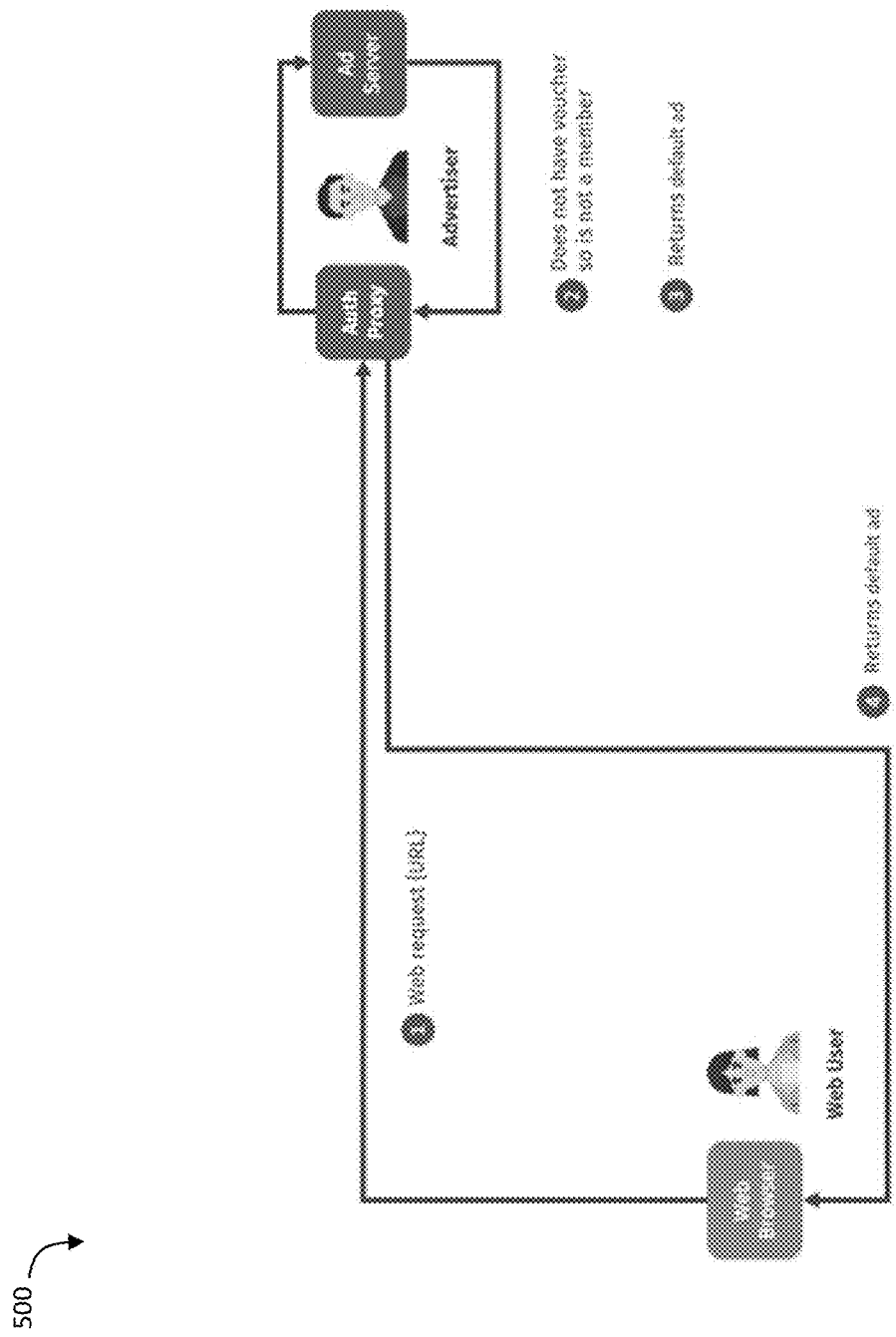
FIG. 5 is a schematic diagram of a cryptography system, according to an embodiment.

FIG. 5 is a schematic diagram of a cryptography system 500, according to an embodiment. The cryptography system 500 can include a plurality of compute devices not shown in FIG. 5. For example, the cryptography system 500 can include a user compute device that is associated with the web user shown in FIG. 5 and that is configured to store in memory and execute via a processor the web browser shown in FIG. 5. The user compute device can be functionally and/or structurally similar to the user compute device 110 of FIG. 1 and/or the compute device 201 of FIG. 2. The cryptography system 500 can also include a provider compute device that is associated with the advertiser shown in FIG. 5 and that is configured to store in memory and execute via a processor the authentication (auth) proxy and the ad server, shown in FIG. 5. The provider compute device can be functionally and/or structurally similar to the provider compute device 130 of FIG. 1 and/or the compute device 201 of FIG. 2. The cryptography system 500 can be configured to determine whether the web user is a member of a platform configured to assign membership identifiers to web users, generate zero-knowledge proofs based on user data and configured to cause targeted data to be sent to the web user, and/or perform at least some of the methods described herein. In some instances, a web user can send a web request to a provider (e.g., the advertiser). Using the authentication proxy executed via the provider compute device, the provider can determine that the web user did not send a membership identifier (e.g., a voucher) to the provider, which can indicate that the web user is not a member of the platform. As a result, the authentication proxy can cause the ad server to send a default ad (and not a targeted ad) to be displayed via the web browser of the web user.

Figure 6:
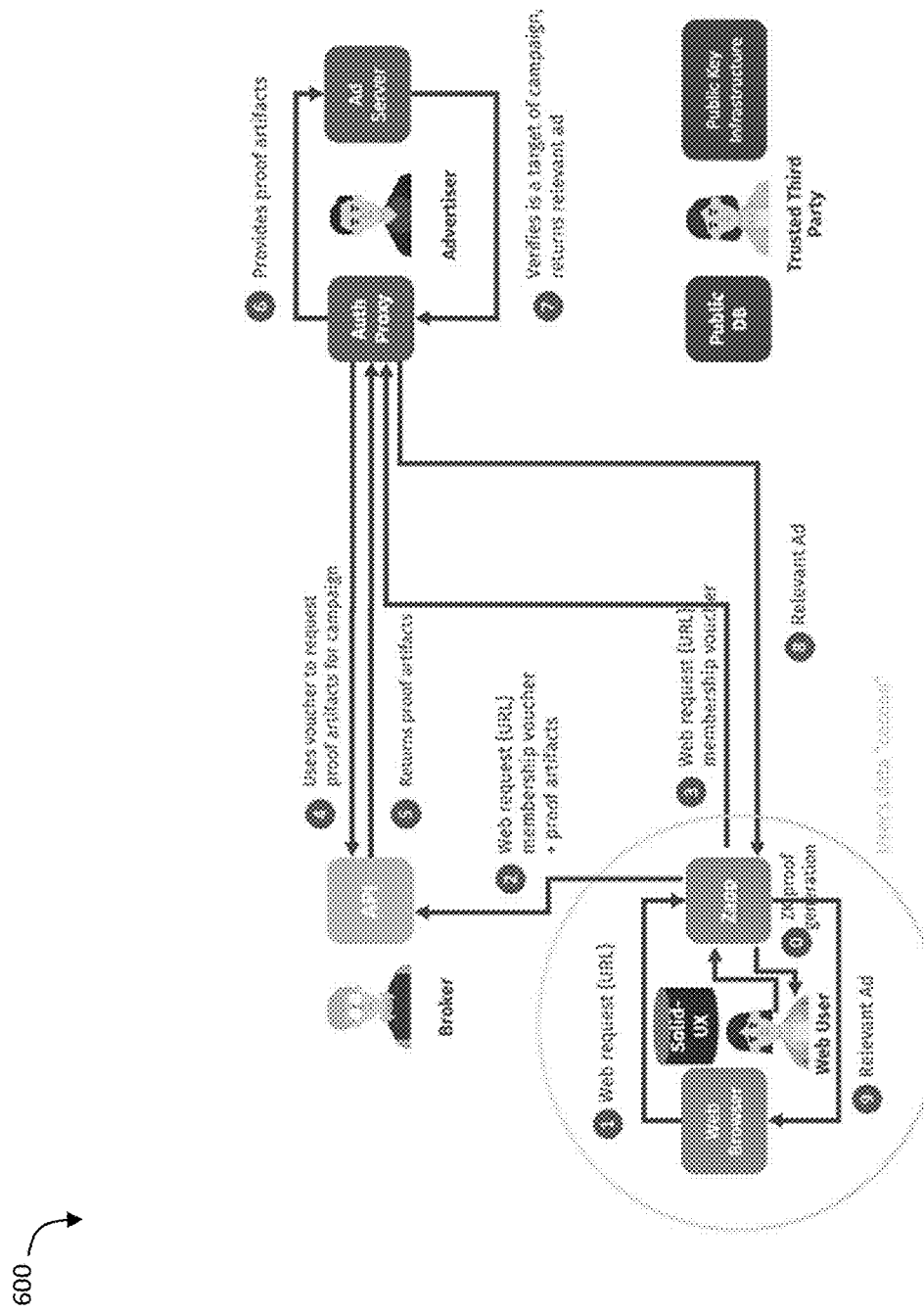
FIG. 6 is a schematic diagram of a cryptography system, according to an embodiment.

FIG. 6 is a schematic diagram of a cryptography system 600, according to an embodiment. The cryptography system 600 can include a plurality of compute devices not shown in FIG. 6. For example, the cryptography system 600 can include a user compute device that is associated with the web user shown in FIG. 6 and that is configured to store in memory and execute via a processor the web browser, the data pod user experience (e.g., the Solid-UX), and the proof generation app (e.g., Zapp), shown in FIG. 6. The user compute device can be functionally and/or structurally similar to the user compute device 110 of FIG. 1 and/or the compute device 201 of FIG. 2. The cryptography system 600 can also include a broker compute device that is associated with the broker shown in FIG. 6 and that is configured to store in memory and execute via a processor the API shown in FIG. 6. The broker compute device can be functionally and/or structurally similar to the broker compute device 120 of FIG. 1 and/or the compute device 201 of FIG. 2. The cryptography system 600 can also include a provider compute device that is associated with the advertiser shown in FIG. 6 and that is configured to store in memory and execute via a processor the authentication (auth) proxy and the ad server, shown in FIG. 6. The provider compute device can be functionally and/or structurally similar to the provider compute device 130 of FIG. 1 and/or the compute device 201 of FIG. 2. The cryptography system 600 can be configured to perform at least some of the methods described herein. For example, the cryptography system 600 can be configured to perform the methods 1100, 1200, and/or 1300, described herein. The cryptography system 600 can include a data cocoon associated with the web user and/or the user compute device. The data cocoon can include, for example, user data stored in a data pod(s) (e.g., personal online data storage and/or a decentralized and/or secured data store configured to facilitate user control over user data).

Figure 7:
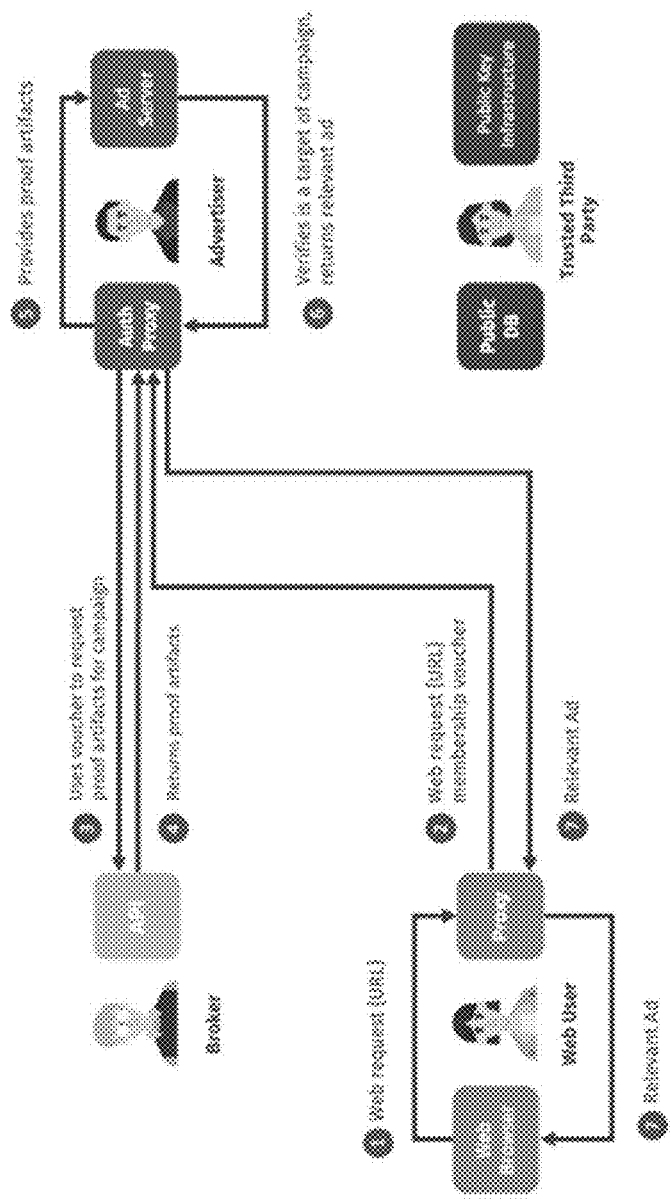
FIG. 7 is a schematic diagram of a cryptography system, according to an embodiment.

FIG. 7 is a schematic diagram of a cryptography system 700, according to an embodiment. The cryptography system 700 can include a plurality of compute devices not shown in FIG. 7. For example, the cryptography system 700 can include a user compute device that is associated with the web user shown in FIG. 7 and that is configured to store in memory and execute via a processor the web browser, the data pod user experience (e.g., the Solid-UX), and the proof generation app (e.g., Zapp), shown in FIG. 7. The user compute device can be functionally and/or structurally similar to the user compute device 110 of FIG. 1 and/or the compute device 201 of FIG. 2. The cryptography system 700 can also include a broker compute device that is associated with the broker shown in FIG. 7 and that is configured to store in memory and execute via a processor the API shown in FIG. 7. The broker compute device can be functionally and/or structurally similar to the broker compute device 120 of FIG. 1 and/or the compute device 201 of FIG. 2. The cryptography system 700 can also include a provider compute device that is associated with the advertiser shown in FIG. 7 and that is configured to store in memory and execute via a processor the authentication (auth) proxy and the ad server, shown in FIG. 7. The provider compute device can be functionally and/or structurally similar to the provider compute device 130 of FIG. 1 and/or the compute device 201 of FIG. 2. In some implementations, the broker compute device can be configured to store an indication (e.g., a proof) of data associated with the web user, such that when a user sends a web request and a membership voucher to the advertiser, the advertiser can request (via the provider compute device) proof artifacts. Then, the broker can provide (via the broker compute device) the proof artifacts without the web user sending a proof to the broker at a time substantially contemporaneous to the sending of the web request and membership voucher to the advertiser.

Figure 8:
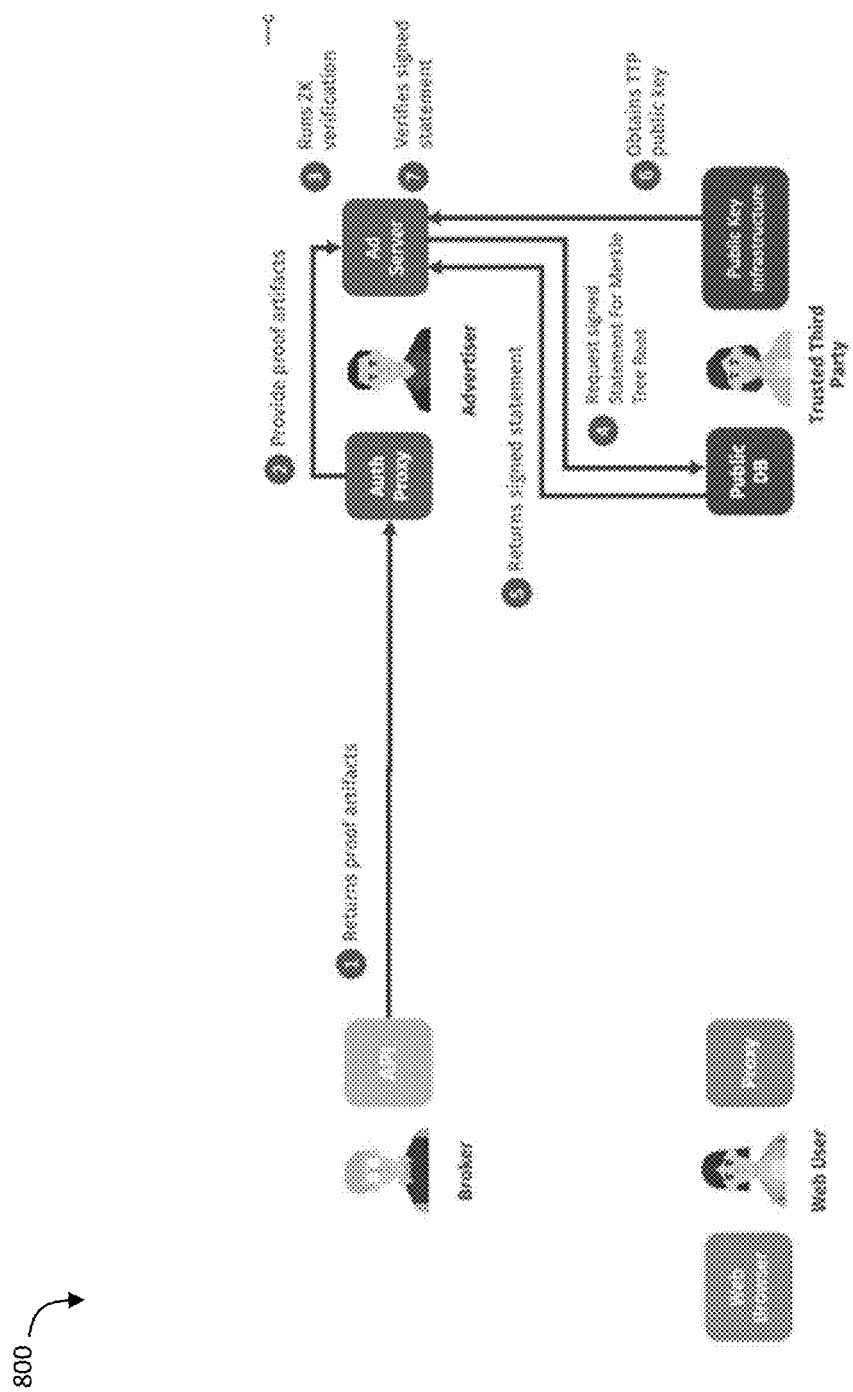
FIG. 8 is a schematic diagram of a cryptography system, according to an embodiment.

FIG. 8 is a schematic diagram of a cryptography system 800, according to an embodiment. The cryptography system 800 can be structurally and/or functionally equivalent to the cryptography systems 100 of FIG. 1, 500 of FIG. 5, 600 of FIG. 6, and/or 700 of FIG. 7. The cryptography system 800 can include a TTP compute device (e.g., a compute device functionally and/or structurally similar to the TTP compute device 140 of FIG. 1) associated with the trusted third party (TTP) shown in FIG. 8. The advertiser can use the TTP to verify public data associated with the web user, as described herein. For example, the advertiser can request a signed statement from the TTP, and the TTP can generate (e.g., via the TTP compute device and a Merkle signature scheme, described herein) and return the signed statement. The advertiser can verify the signed statement using a public key, as described herein.

Figure 9:
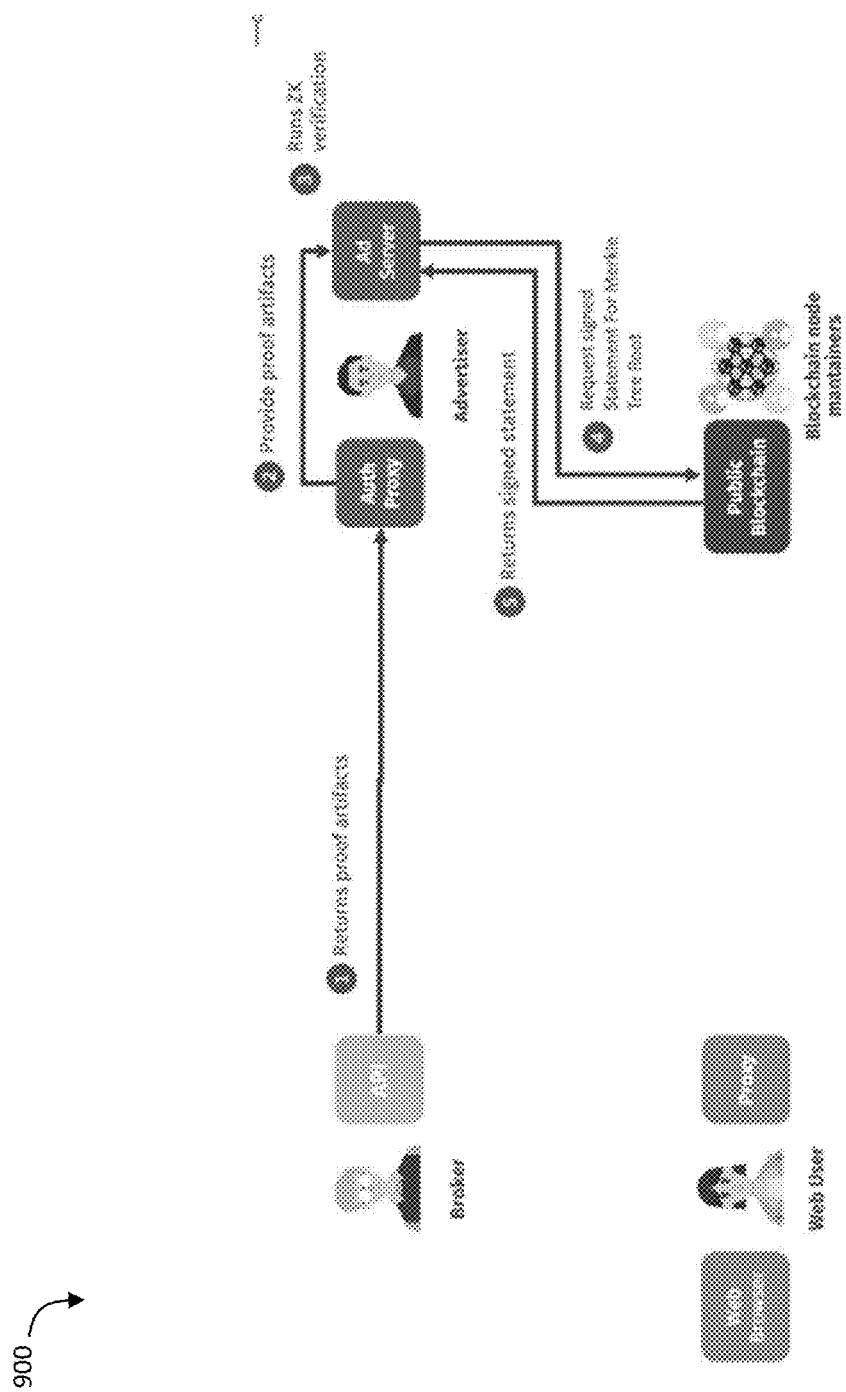
FIG. 9 is a schematic diagram of a cryptography system, according to an embodiment.

FIG. 9 is a schematic diagram of a cryptography system 900, according to an embodiment. At least a portion of the cryptography system 800 can be structurally and/or functionally equivalent to at least a portion of the cryptography systems 100 of FIG. 1, 500 of FIG. 5, 600 of FIG. 6, 700 of FIG. 7, and/or 800 of FIG. 8. The cryptography system 900 can include a TTP instantiated by a blockchain (or other type of distributed ledger).

Figure 10:
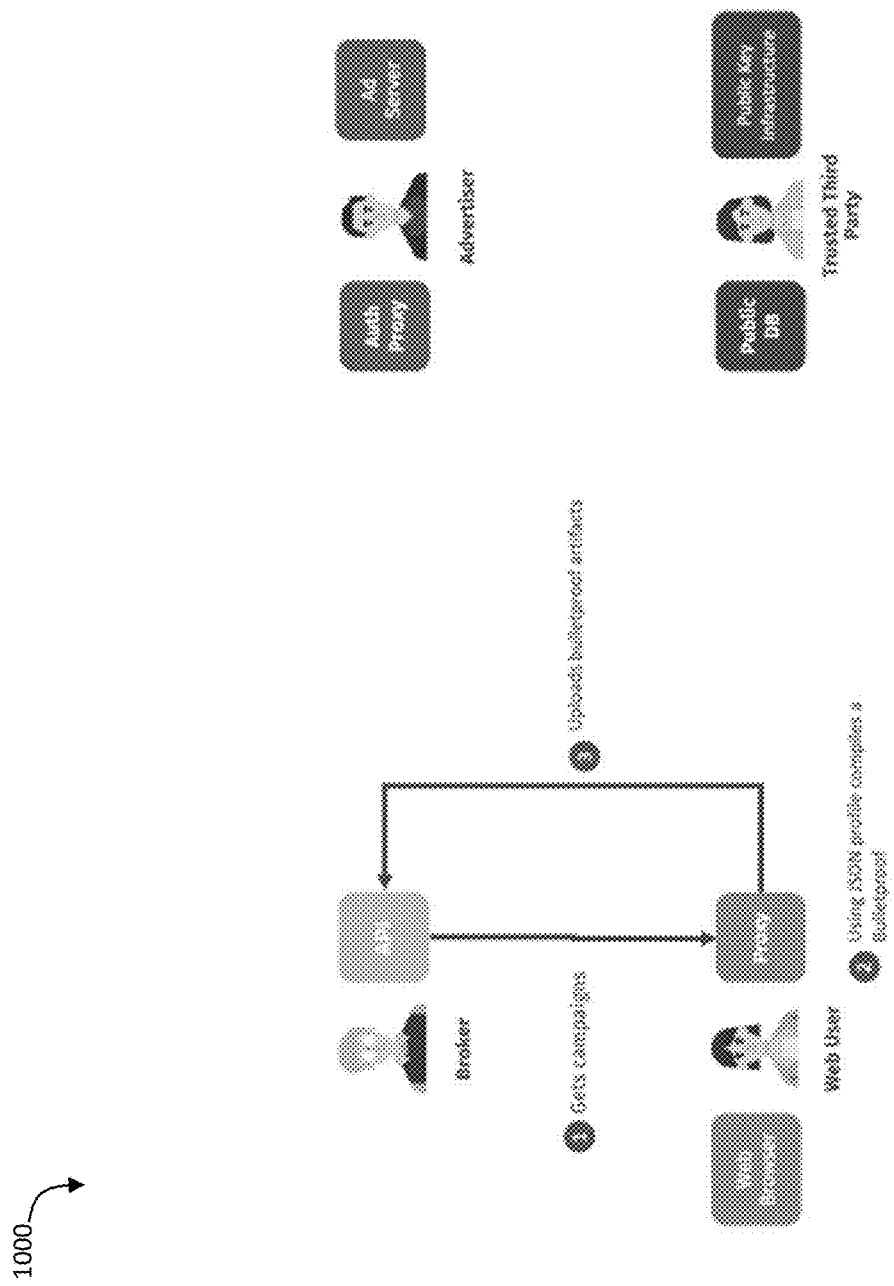
FIG. 10 is a schematic diagram of a cryptography system, according to an embodiment.

FIG. 10 is a schematic diagram of a cryptography system 1000, according to an embodiment. The cryptography system 1000 can be structurally and/or functionally equivalent to the cryptography systems 100 of FIG. 1, 500 of FIG. 5, 600 of FIG. 6, 700 of FIG. 7, and/or 800 of FIG. 8. The cryptography system 1000 can be configured to receive a campaign (e.g., provider-defined condition(s) that data associated with the web user can conform with and/or satisfy to receive a targeted service from that provider) from a broker. In some instances, the broker can receive the campaign from the advertiser. In response to receiving the campaign, the web user, via a user compute device, can generate and send a proof(s) (e.g., a Bulletproof zero-knowledge proof) configured to indicate that the web user is, for example, a relevant target for an ad campaign.

Figure 11:
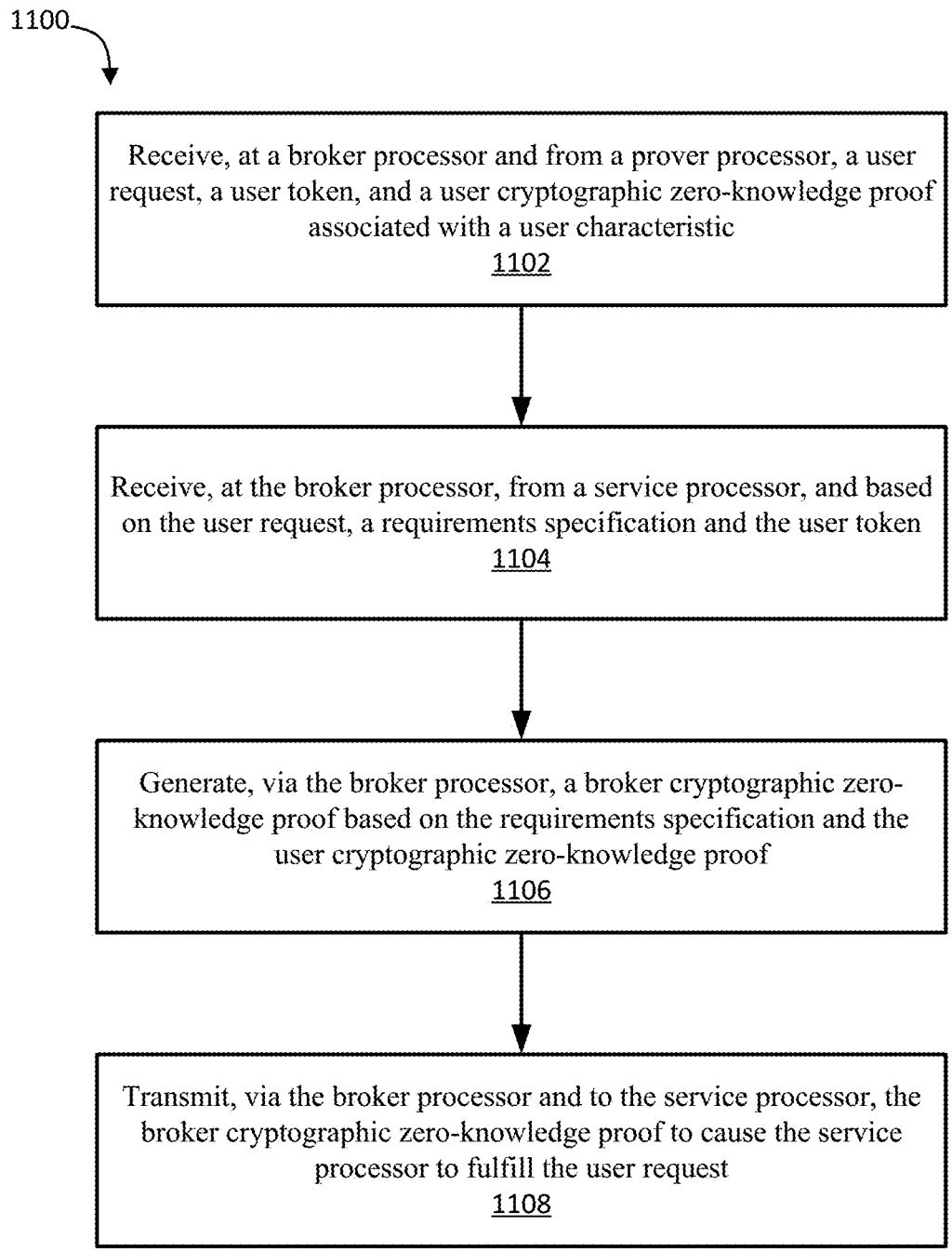
FIG. 11 is a flowchart showing a method of using a cryptography system to provide a service, according to an embodiment.

FIG. 11 is a flowchart showing a method 1100 illustrating an example implementation using a cryptography system described herein (e.g., the cryptography system 100 of FIG. 1). Portions of the method 1100 can be implemented using a processor (e.g., the processor 220 of FIG. 2) of any suitable compute device (e.g., the broker compute device 120 and/or the compute device 201 of FIG. 2). The method 1100 can include a method of providing services over networks to users based on limited user data.

At 1102, the method 1100 includes receiving, at a broker processor and from a prover processor, a user request, a user token (e.g., identifier), and a user cryptographic zero-knowledge proof associated with a user characteristic. The method 1100, at 1104, includes receiving, at the broker processor, from a service processor, and based on the user request, a requirements specification and the user token. At 1106, the method 1100 includes generating, via the broker processor, a broker cryptographic zero-knowledge proof based on the requirements specification and the user cryptographic zero-knowledge proof. The method 1100, at 1108, includes transmitting, via the broker processor and to the service processor, the broker cryptographic zero-knowledge proof to cause the service processor to fulfill the user request.

Figure 12:
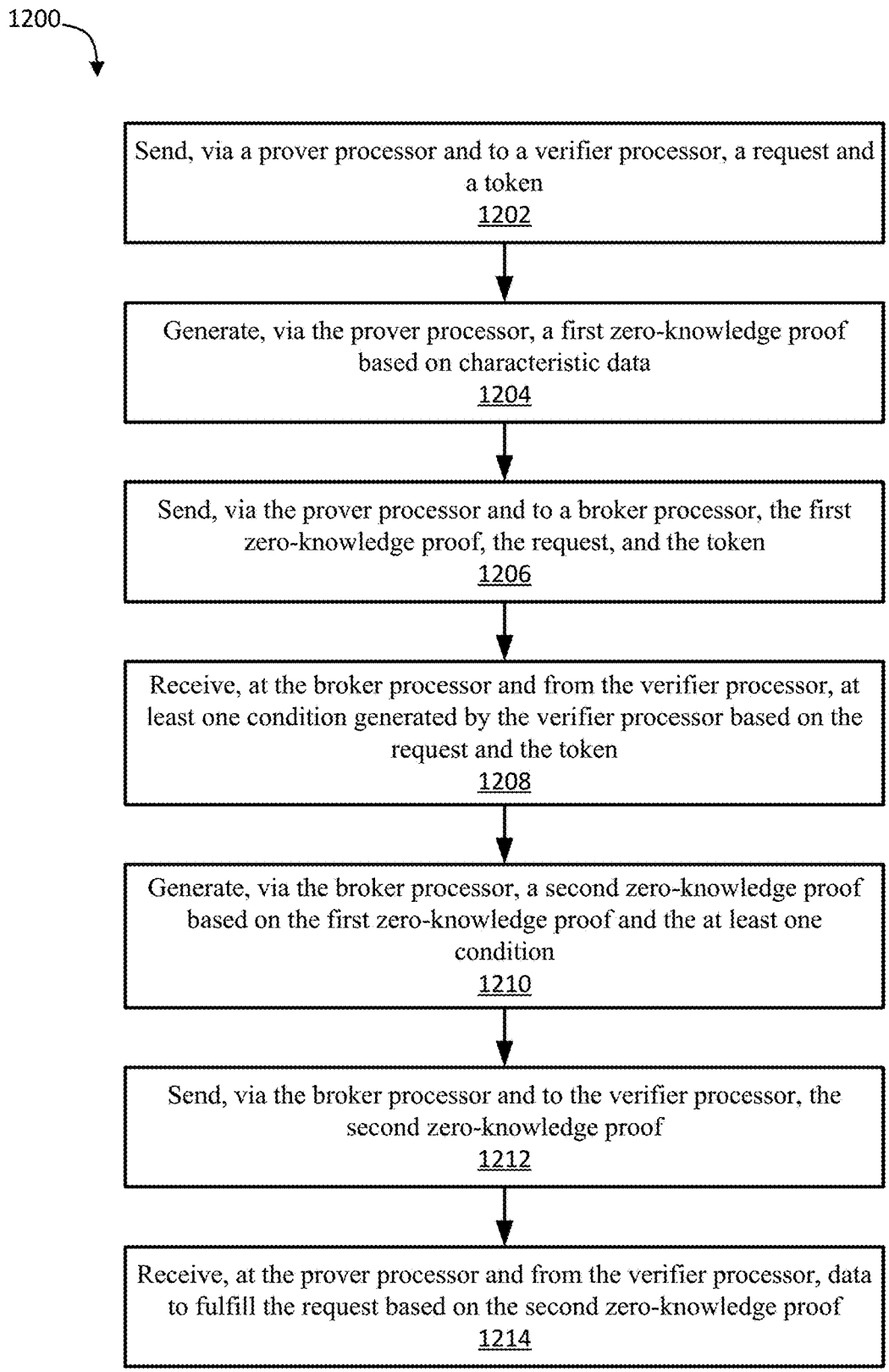
FIG. 12 is a flowchart showing a method of using a cryptography system to provide a service, according to an embodiment.

FIG. 12 is a flowchart showing a method 1200 illustrating an example implementation using a cryptography system described herein (e.g., the cryptography system 100 of FIG. 1). Portions of the method 1200 can be implemented using a processor (e.g., the processor 220 of FIG. 2) of any suitable compute device (e.g., the user compute device 110, the broker compute device 120 and/or the compute device 201 of FIG. 2). The method 1200 can include a method of providing services over networks to users based on limited user data.

At 1202, the method 1200 includes sending, via a prover processor and to a verifier processor, a request and a token (e.g., identifier). The method 1200, at 1204, includes generating, via the prover processor, a first zero-knowledge proof based on characteristic data. At 1206, the method 1200 includes sending, via the prover processor and to a broker processor, the first zero-knowledge proof, the request, and the token. The method 1200 at 1208 includes receiving, at the broker processor and from the verifier processor, at least one condition generated by the verifier processor based on the request and the token. At 1210, the method 1200 includes generating, via the broker processor, a second zero-knowledge proof based on the first zero-knowledge proof and the at least one condition. At 1212, the method 1200 includes sending, via the broker processor and to the verifier processor, the second zero-knowledge proof. The method 1200, at 1214, includes receiving, at the prover processor and from the verifier processor, data to fulfill the request based on the second zero-knowledge proof.

Figure 13:
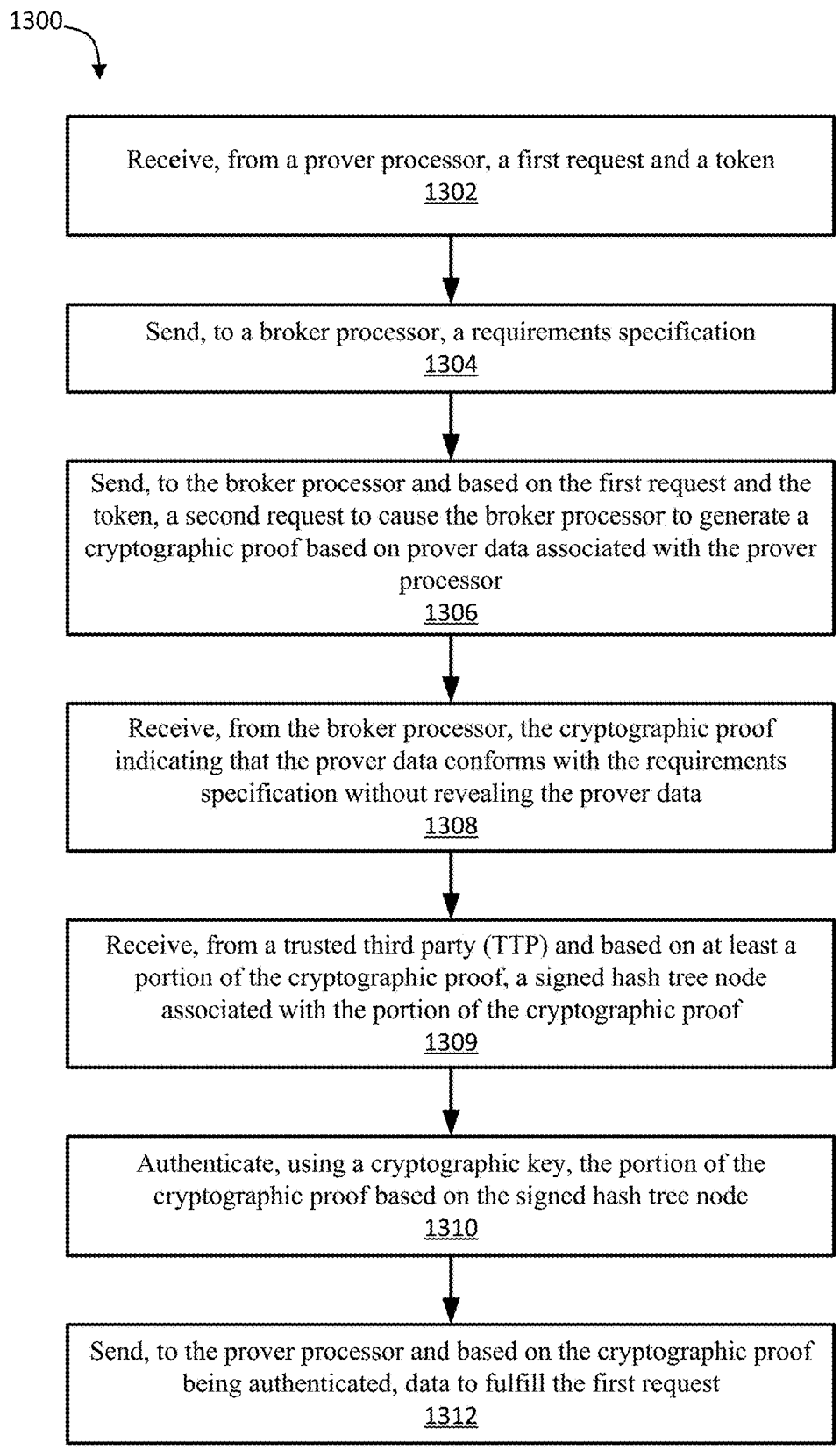
FIG. 13 is a flowchart showing a method of using a cryptography system to provide a service, according to an embodiment.

FIG. 13 is a flowchart showing a method 1300 illustrating an example implementation using a cryptography system described herein (e.g., the cryptography system 100 of FIG. 1). Portions of the method 1300 can be implemented using a processor (e.g., the processor 220 of FIG. 2) of any suitable compute device (e.g., the provider compute device 130 and/or the compute device 201 of FIG. 2). The method 1300 can include a method of providing services over networks to users based on limited user data.

At 1302, the method 1300 includes receiving, from a prover processor, a first request and a membership indicator. At 1304, the method 1300 includes sending, to a broker processor, a requirements specification. The method 1300, at 1306, includes sending, to the broker processor and based on the first request and the membership indicator, a second request to cause the broker processor to generate a proof based on prover data associated with the prover processor. At 1308, the method 1300 includes receiving, from the broker processor, the proof indicating that the prover data conforms with the requirements specification without revealing the prover data. At 1309, the method 1300 includes receiving, from a trusted third party (TTP) and based on at least a portion of the cryptographic proof, a signed hash tree node associated with the portion of the cryptographic proof. The method 1300, at 1310, includes authenticating, using a cryptographic key, the at least a portion of the cryptographic proof based on the signed hash tree node. At 1312, the method 1300 includes sending, to the prover processor and based on the proof being valid, data to fulfill the first request.

In at least one embodiment, as described above, the systems (e.g., the cryptography system 100 of FIG. 1) and/or methods (e.g., the methods 1100, 1200, and/or 1300) herein can be used, for example, for targeted advertising and/or the like. Alternatively or in addition, these systems and methods can be used in other applications that include verifying a user before providing a service to that user. For example, the systems and methods described herein can be used in the context of health care, health insurance, banking, financial technology, "know your customer" applications, etc.

In an embodiment, a method includes receiving, at a broker processor and from a prover processor, a user request, a user token, and a user cryptographic zero-knowledge proof associated with a user characteristic. The method also includes receiving, at the broker processor, from a service processor, and based on the user request, a requirements specification and the user token. The method also includes generating, via the broker processor, a broker cryptographic zero-knowledge proof based on the requirements specification and the user cryptographic zero-knowledge proof. The method also includes transmitting, via the broker processor and to the service processor, the broker cryptographic zero-knowledge proof to cause the service processor to fulfill the user request.

In some implementations, the user cryptographic zero-knowledge proof is the broker cryptographic zero-knowledge proof. In some implementations, the user cryptographic zero-knowledge proof is different from the broker cryptographic zero-knowledge proof.

In some implementations, the user token can be associated with a user for at least one of a pre-defined time period or a pre-defined number of uses. In some implementations, the user request can include a request associated with a uniform resource locator (URL). In some implementations, the user cryptographic zero-knowledge proof can be based on (1) a user profile organized according to a schema and (2) an indication of data within the user profile to be verified. In some implementations, the requirements specification can include the indication of the data. In some implementations, the indication of the data can include an indication of public data, and the indication of the public data can be associated with a signed hash tree root generated by a trusted third party (TTP).

In an embodiment, a method includes sending, via a prover processor and to a verifier processor, a request and a token, and generating, via the prover processor, a first zero-knowledge proof based on characteristic data. The method also includes sending, via the prover processor and to a broker processor, the first zero-knowledge proof, the request, and the token. The method also includes receiving, at the broker processor and from the verifier processor, at least one condition generated by the verifier processor based on the request and the token. The method also includes generating, via the broker processor, a second zero-knowledge proof based on the first zero-knowledge proof and the at least one condition. The method also includes sending, via the broker processor and to the verifier processor, the second zero-knowledge proof. The method also includes receiving, at the prover processor and from the verifier processor, data to fulfill the request based on the second zero-knowledge proof.

In some implementations, the first zero-knowledge proof is the second zero-knowledge proof. In some implementations, the first zero-knowledge proof is different from the second zero-knowledge proof.

In some implementations, the second zero-knowledge proof can be configured to be verified via the verifier processor and using a trusted third party, and the receiving the data can be based on the second zero-knowledge proof being verified. In some implementations, the trusted third party can be configured to generate a signed hash tree root, and the second zero-knowledge proof can be configured to be verified based on the signed hash tree root. In some implementations, the signed hash tree root can be associated with public data included in the characteristic data. In some implementations, the request can include a request to access web data. In some implementations, the method can further include receiving, at the prover processor and from the broker processor, the at least one condition, and generating, via the broker processor, the first zero-knowledge proof based on the at least one condition. In some implementations, the second zero-knowledge proof can be configured to obfuscate the characteristic data from the verifier processor. In some implementations, the broker processor can be associated with a certificate (1) signed by a user associated with the prover processor and (2) configured to cause the broker processor to decrypt the first zero-knowledge proof.

In an embodiment, a non-transitory, processor-readable medium stores instructions that, when executed by a processor, cause the processor to receive, from a prover processor, a first request and a token, and send, to a broker processor, a requirements specification. The instructions also cause the processor to send, to the broker processor and based on the first request and the token, a second request to cause the broker processor to generate a cryptographic proof based on prover data associated with the prover processor. The instructions also cause the processor to receive, from the broker processor, the cryptographic proof indicating that the prover data conforms with the requirements specification without revealing the prover data. The instructions also cause the processor to receive, from a trusted third party (TTP) and based on at least a portion of the cryptographic proof, a signed hash tree node associated with the portion of the cryptographic proof. The instructions also cause the processor to authenticate, using a cryptographic key, the portion of the cryptographic proof based on the signed hash tree node. The instructions also cause the processor to send, to the prover processor and based on the proof being valid, data to fulfill the first request.

In some implementations, the prover processor can be a first prover processor, the token can be a first token, the data can be first data, and the non-transitory, processor-readable medium can further store instructions to cause the processor to receive, from a second prover processor, a third request, and determine that the third request is not associated with a second token. The instructions can also cause the processor to send, to the second prover processor, second data different from the first data to fulfill the third request. In some implementations, the cryptographic proof can be associated with public data known to the TTP. In some implementations, the instructions can further cause the processor to receive, based on the signed hash tree node, the cryptographic key from public key infrastructure (PKI) associated with the TTP. In some implementations, the instructions to cause the processor to verify can include instructions to (1) receive a signed hash tree node associated with the representation of the public data, and (2) verify, using a public key, that the signed hash tree node is associated with the trusted third party. In some implementations, the first request can include a request to access web data. In some implementations, the cryptographic proof can include a zero-knowledge proof.

Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using Python, Java, JavaScript, C++, and/or other programming languages and development tools. Additional examples of computer code include, but are not limited to, control signals, encrypted code, and compressed code.

The drawings primarily are for illustrative purposes and are not intended to limit the scope of the subject matter described herein. The drawings are not necessarily to scale; in some instances, various aspects of the subject matter disclosed herein can be shown exaggerated or enlarged in the drawings to facilitate an understanding of different features. In the drawings, like reference characters generally refer to like features (e.g., functionally similar and/or structurally similar elements).

The acts performed as part of a disclosed method(s) can be ordered in any suitable way. Accordingly, embodiments can be constructed in which processes or steps are executed in an order different than illustrated, which can include performing some steps or processes simultaneously, even though shown as sequential acts in illustrative embodiments. Put differently, it is to be understood that such features can not necessarily be limited to a particular order of execution, but rather, any number of threads, processes, services, servers, and/or the like that can execute serially, asynchronously, concurrently, in parallel, simultaneously, synchronously, and/or the like in a manner consistent with the disclosure. As such, some of these features can be mutually contradictory, in that they cannot be simultaneously present in a single embodiment. Similarly, some features are applicable to one aspect of the innovations, and inapplicable to others.

Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) can be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules can include, for example, a processor, a field programmable gate array (FPGA), and/or an application specific integrated circuit (ASIC). Software modules (executed on hardware) can include instructions stored in a memory that is operably coupled to a processor and can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

What is claimed is:

1. A method, comprising:

receiving, at a broker processor and from a prover processor, a user request, a user token, and a user cryptographic zero-knowledge proof associated with a user characteristic;

receiving, at the broker processor, from a service processor, and based on the user request and the user token being received at the service processor from the prover processor, a requirements specification and the user token;

generating, via the broker processor, a broker cryptographic zero-knowledge proof based on the requirements specification and the user cryptographic zero-knowledge proof; and transmitting, via the broker processor and to the service processor, the broker cryptographic zero-knowledge proof to cause the service processor to fulfill the user request.

2. The method of claim 1, wherein the user token is associated with a user for at least one of a pre-defined time period or a pre-defined number of uses.

3. The method of claim 1, wherein the user request includes a request associated with a uniform resource locator (URL).

4. The method of claim 1, wherein the user cryptographic zero-knowledge proof is based on (1) a user profile organized according to a schema and (2) an indication of data within the user profile to be verified.

5. The method of claim 4, wherein the requirements specification includes the indication of the data.

6. The method of claim 4, wherein:
the indication of the data includes an indication of public data; and
the indication of the public data is associated with a signed hash tree root generated by a trusted third party (TTP).

7. The method of claim 1, wherein the user cryptographic zero-knowledge proof is the broker cryptographic zero-knowledge proof.

8. The method of claim 1, wherein the user cryptographic zero-knowledge proof is different from the broker cryptographic zero-knowledge proof.

9. An apparatus, comprising:
a processor; and
a memory operably coupled to the processor, the memory storing instructions to cause the processor to:
receive, from a prover processor, a user request, a user token, and a user cryptographic zero-knowledge proof associated with a user characteristic;
receive, from a service processor and based on the user request and the user token being received at the service processor from the prover processor, a requirements specification and the user token;
generate a broker cryptographic zero-knowledge proof based on the requirements specification and the user cryptographic zero-knowledge proof; and
transmit, to the service processor, the broker cryptographic zero-knowledge proof to cause the service processor to fulfill the user request.

10. The apparatus of claim 9, wherein the user token is associated with a user for at least one of a pre-defined time period or a pre-defined number of uses.

11. The apparatus of claim 9, wherein the user request includes a request associated with a uniform resource locator (URL).

12. The apparatus of claim 9, wherein the user cryptographic zero-knowledge proof is based on (1) a user profile organized according to a schema and (2) an indication of data within the user profile to be verified.

13. The apparatus of claim 12, wherein the requirements specification includes the indication of the data.

14. The apparatus of claim 12, wherein:
the indication of the data includes an indication of public data; and
the indication of the public data is associated with a signed hash tree root generated by a trusted third party (TTP).

15. The apparatus of claim 9, wherein the user cryptographic zero-knowledge proof is the broker cryptographic zero-knowledge proof.

16. The apparatus of claim 9, wherein the user cryptographic zero-knowledge proof is different from the broker cryptographic zero-knowledge proof.

17. A non-transitory, processor-readable medium storing instructions that, when executed by a processor, cause the processor to:
receive, from a prover processor, a user request, a user token, and a user cryptographic zero-knowledge proof associated with a user characteristic;
receive, from a service processor and based on the user request and the user token being received at the service processor from the prover processor, a requirements specification and the user token;
generate a broker cryptographic zero-knowledge proof based on the requirements specification and the user cryptographic zero-knowledge proof, and
transmit, to the service processor, the broker cryptographic zero-knowledge proof to cause the service processor to fulfill the user request.

18. The non-transitory, processor-readable medium of claim 17, wherein the user token is associated with a user for at least one of a pre-defined time period or a pre-defined number of uses.

19. The non-transitory, processor-readable medium of claim 17, wherein the user request includes a request associated with a uniform resource locator (URL).

20. The non-transitory, processor-readable medium of claim 17, wherein the user cryptographic zero-knowledge proof is based on (1) a user profile organized according to a schema and (2) an indication of data within the user profile to be verified.

21. The non-transitory, processor-readable medium of claim 20, wherein the requirements specification includes the indication of the data.

22. The non-transitory, processor-readable medium of claim 20, wherein:
the indication of the data includes an indication of public data; and
the indication of the public data is associated with a signed hash tree root generated by a trusted third party (TTP).

23. The non-transitory, processor-readable medium of claim 17, wherein the user cryptographic zero-knowledge proof is the broker cryptographic zero-knowledge proof.

24. The non-transitory, processor-readable medium of claim 17, wherein the user cryptographic zero-knowledge proof is different from the broker cryptographic zero-knowledge proof.

* * * * *